United States Patent
Orriss et al.

(12)
(10) Patent No.: US 6,178,835 B1
(45) Date of Patent: Jan. 30, 2001

(54) TOOL, APPARATUS AND METHOD OF TESTING A FIXTURE

(75) Inventors: David J. Orriss, Cowplain; Anthony R. Hearn, South Wonston, both of (GB)

(73) Assignee: Havant International Limited, Hampshire (GB)

(*) Notice: Under 35 U.S.C. 154(b), the term of this patent shall be extended for 0 days.

(21) Appl. No.: 09/210,662

(22) Filed: Dec. 14, 1998

(30) Foreign Application Priority Data

Dec. 16, 1997 (GB) .................................... 9726558

(51) Int. Cl.[7] .................................................. G01N 19/00
(52) U.S. Cl. ................................... 73/865.9; 360/75
(58) Field of Search ........................ 73/862.27, 862.51, 73/865.8, 865.9; 360/75

(56) References Cited

U.S. PATENT DOCUMENTS

| | | | | |
|---|---|---|---|---|
| 5,339,209 | * | 8/1994 | Dion | 360/105 |
| 5,465,035 | * | 11/1995 | Scaramuzzo, Jr. et al. | 318/561 |
| 5,485,323 | * | 1/1996 | Anderson et al. | 360/78.08 |
| 5,616,869 | * | 4/1997 | Valent | 73/862.541 |
| 5,682,274 | * | 10/1997 | Brown et al. | 360/77.04 |

\* cited by examiner

*Primary Examiner*—Max Noori
(74) *Attorney, Agent, or Firm*—Pillsbury Madison & Sutro LLP

(57) ABSTRACT

A tool (20) is provided for mounting in and testing a fixture (12) used for mounting a device, such as a disk drive, having an arm which is movable to selected locations by an actuator. The tool has a movable member (25) which is movable to mimic movement of an arm of such a device mounted in the fixture (12). Movement of the tool (20) in the fixture (12) as a reaction to movement of the movable member (25) is measured and compared with a standard to enable the fixture to be passed or failed.

16 Claims, 3 Drawing Sheets

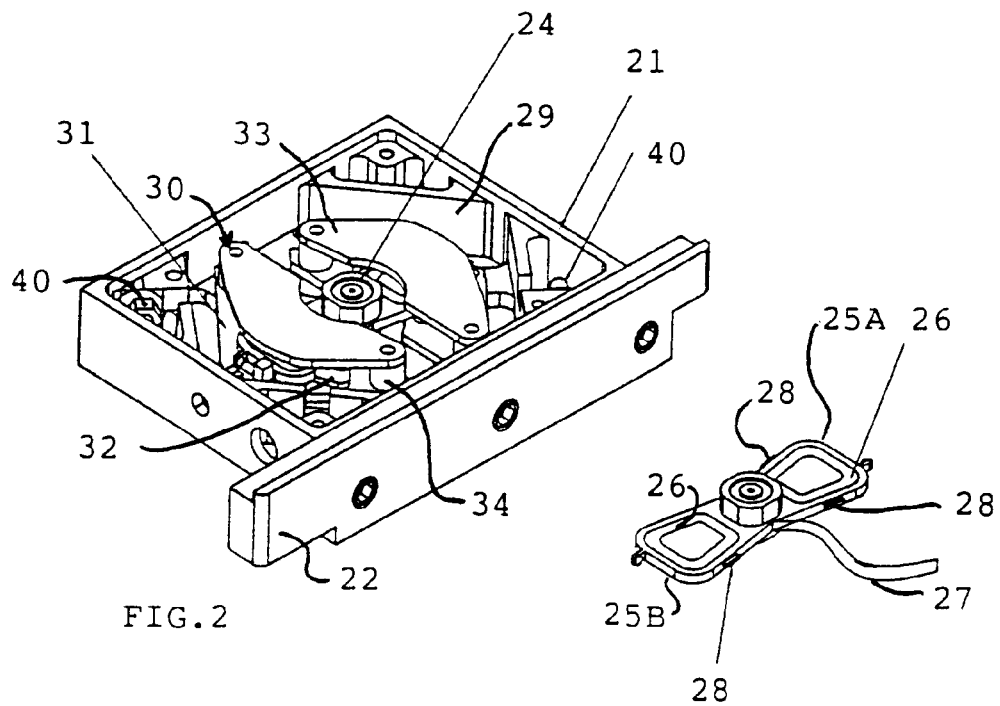
FIG.2
FIG.4
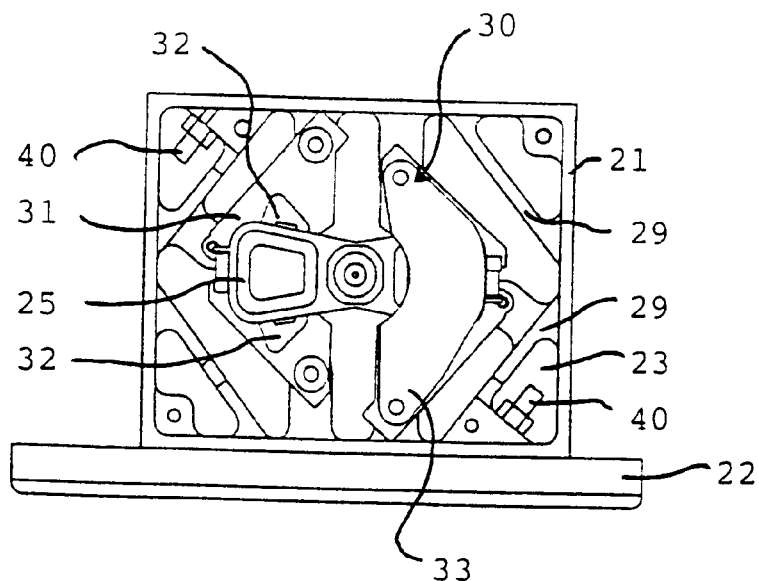
FIG.3

TOOL, APPARATUS AND METHOD OF TESTING A FIXTURE

The present invention relates to a tool, apparatus and a method for testing a fixture.

The present invention has particular application to testing of a fixture which provides a mechanical support for a disk drive.

In a device having a movable arm, such as a hard disk drive, an arm which carries a read/write head is moved over the surface of a magnetic disk on which data is stored. The arm is driven to position the head over a selected location on the disk to enable the head to write data to the disk or to read data from the disk, as the case may be. Accurate location and seeks between locations are required of the arm. Any movement of the device as a whole can cause a positioning error.

The disk drive itself is mounted in a fixture which provides a mechanical support for the disk drive. The fixture might be, for example, a mounting within a housing for a personal computer. Such a fixture might alternatively be a bay in a tester rack an example of which is shown in FIG. 1. The tester rack 11 has plural bays or fixtures 12 each of which has a carrier 13 which carries a disk drive. Plural disk drives are mounted in the respective fixtures 12 of the tester rack 11 so that operation of the plural disk drives can be tested following manufacture and prior to the disk drives being sold or incorporated into a personal computer or other system using such a disk drive.

Ideally, movement of the movable arm of the device is completely independent of the fixture in which the device is mounted. However, in practice, this is not feasible. In particular, in practice, there is usually some mechanical coupling between the device and the fixture. This is a particular problem with a disk drive. For example, when a disk drive is mounted in a tester rack 11 as shown in FIG. 1, unless the drive is mounted in the fixture 12 with absolute rigidity such that it cannot move at all, movement of the arm of the device generates a reaction torque in the disk drive casing which results in a rotation of the disk drive casing in a direction opposite the movement of the arm. This reaction movement of the casing couples with the normal settle motion of the moving arm. This can give a false indication that the head mounted on the arm is in the correct position on the disk or "on track". This false indication can allow track writing to start for example, the track writing being interrupted by the continuation of the motion of the arm. This causes an off-track motion of the head which in turn results in a "write fault" detect error. It has been found that the degree of motion coupling with the disk drive can vary between the fixtures 12 in which the various disk drives are mounted.

Because of the variability of the fixtures 12, the fixtures 12 have conventionally been individually tested prior to their use in supporting disk drives when the disk drives are themselves being tested. To date, the fixtures 12 have been tested by inserting a disk drive and carrying out a series of write-fault measurements. However, this in itself produces numerous problems. First, the disk drives themselves are variable and do not provide a standard tool for measuring the variability of the fixtures 12. Secondly, because of the variability of the disk drives used for testing the bays 12, a very large number of measurements was required in order to provide some reasonable spread of results on which statistical analysis could be carried out, the process thus taking several hours to complete. In any event, the results obtained provided no real measure of the errors caused by the coupling of the arm motion with the reaction movement of the disk drive.

It is therefore an object of the present invention to provide improved means for testing a fixture which is used for mounting a device having a movable arm. Typically, such a device requires accurate location of the arm and seeks between locations such that movement of the device as a whole can cause a positioning error. The invention has particular applicability to testing fixtures which are used for mounting disk drives during testing of the disk drives, but the invention has general applicability to any fixture used for mounting a device having a movable arm.

According to a first aspect of the present invention, there is provided a tool for mounting in and testing a fixture used for mounting a device having an arm which is movable to selected locations by an actuator, the tool comprising: a movable member which is movable to mimic movement of an arm of a device mounted in the fixture; and, means for measuring movement of the tool in a fixture on which the tool is mounted as a reaction to movement of the movable member.

The tool provides a standard device which can be used for testing a fixture in a standard and repeatable manner.

In an embodiment, the movable member is arranged to move solely in a rotary direction about an axis. This is of particular application where the arm of the device normally mounted in the fixture is moved in a rotary direction by a rotary actuator.

The movable member may comprise a coil mounted for rotary movement about said axis, the tool further comprising a permanent magnet coupled magnetically to the coil such that the coil moves about said axis when a current is applied to the coil.

The coil in a preferred embodiment is a butterfly coil and the tool preferably comprises a permanent magnet for each wing of the coil.

A magnetically soft material is preferably mounted on the coil which acts with the permanent magnet to centralise the coil in the tool. Using a magnetically soft material, such as magnetically soft iron blocks, centralises the coil in a manner having a very low resonant frequency.

The measuring means may comprise an accelerometer for measuring the acceleration of the tool in a fixture in which the tool is mounted as a reaction to movement of the movable member.

The measuring means in an embodiment is arranged to measure rotary movement of the tool.

In a preferred embodiment, the measuring means comprises two accelerometers arranged on a line passing through the centre of rotation of the tool and on opposite sides of said centre of rotation such that the difference between the outputs of said accelerometers provides a measure of rotary movement of said tool only.

The tool may have detachable plates. These allow the overall size and/or mass and/or resonant frequency of the tool to be varied as required by using different side plates of different size, shape or profile.

According to a second aspect of the present invention, there is provided apparatus for testing a fixture used for mounting a device having an arm which is movable by an actuator, the apparatus comprising: a tool having a movable member which is movable to mimic movement of an arm of a device mounted in the fixture; means for measuring movement of the tool in a fixture on which the tool is mounted as a reaction to movement of the movable member; and, movement comparing means for comparing the movement of the movable member with movement of the tool in a fixture in which the tool is mounted as a reaction to movement of the movable member.

The apparatus preferably comprises: drive means for providing a drive signal to drive the movable member to move within a fixture; means for outputting a movement signal indicative of movement of the tool in a fixture in which the tool is mounted as a reaction to movement of the movable member; the movement comparing means comprising signal comparing means for comparing the drive signal with the movement signal; and, determining means for determining whether the fixture passes or fails on the basis of said comparison.

According to a third aspect of the present invention, there is provided a method of testing a fixture used for mounting a device having an arm which is movable by an actuator, the method comprising the steps of: inserting a tool having a movable member in said fixture; moving the movable member in the fixture to mimic movement of an arm of a device normally mounted in the fixture; measuring movement of the tool in the fixture as a reaction to movement of the movable member; and, comparing the movement of the movable member with movement of the tool in response thereto.

It may then be determined on the basis of said comparison whether the fixture passes or fails.

Preferably, the moving step includes applying a drive signal to the movable member to cause the movable member to move; the measuring step includes obtaining an output signal representative of the movement of the tool in response thereto; and, the comparing step includes comparing the drive signal with the output signal to obtain a transfer function for the fixture, the transfer function being compared with a standard in the determining step.

An embodiment of the present invention will now be described by way of example with reference to the accompanying drawings, in which:

FIG. 2 is a perspective view of an example of a tool in accordance with the present invention;

FIG. 3 is a plan view from above of the partially assembled tool of FIG. 2;

FIG. 4 is a perspective view of a coil of the tool of FIGS. 2 and 3; and,

Figure 1:
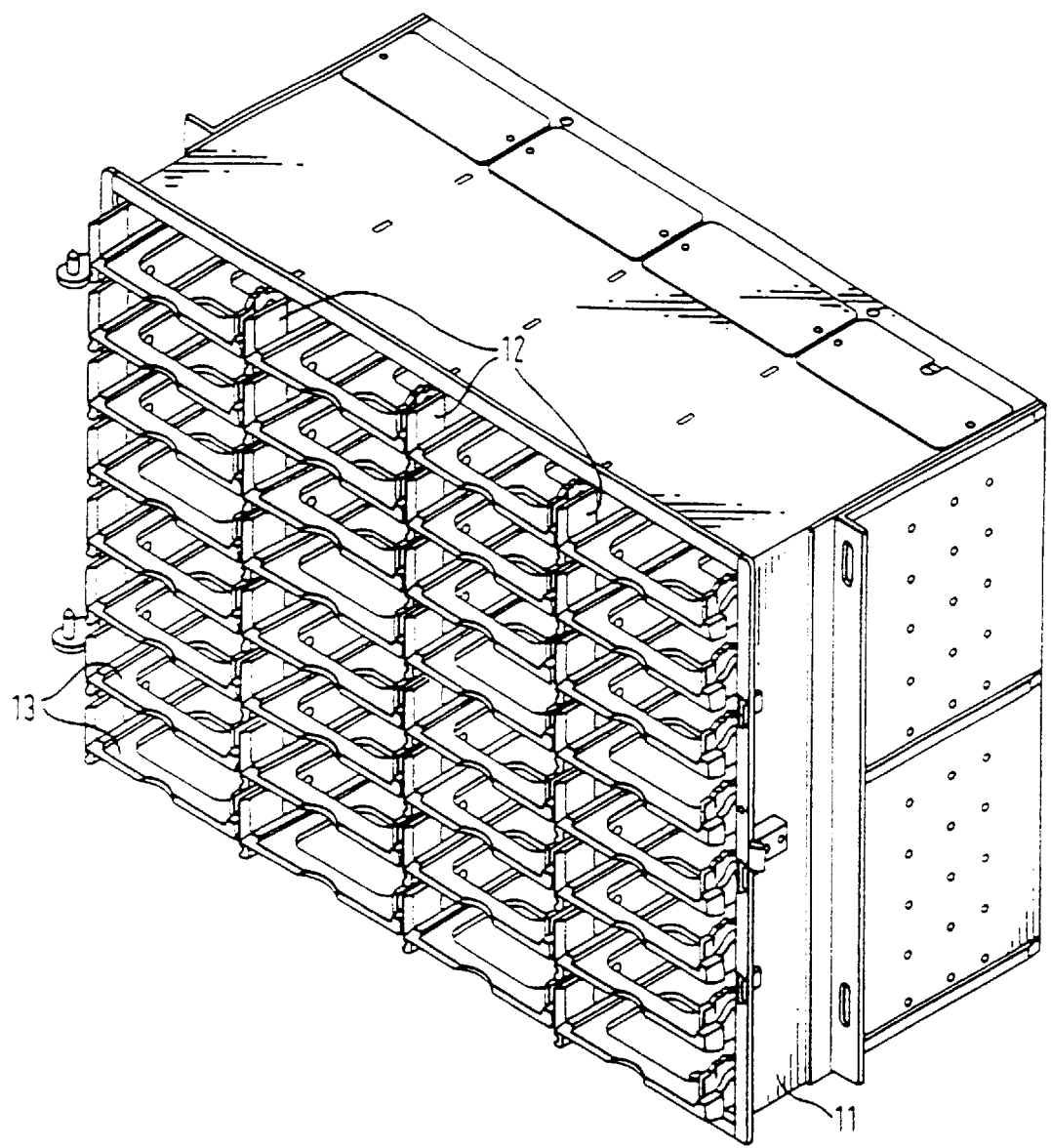
FIG. 1 is a perspective view of a prior art tester rack.

As briefly mentioned above, a tester rack 11 shown in FIG. 1 has plural bays or fixtures 12. Each fixture 12 has a carrier 13 on which is removably mounted a device, such as a disk drive, having an arm which is movable, to enable the device to be tested. Such a device has an arm which requires accurate location and seeks between locations such that any movement of the casing or base of the device can cause an error.

A tool 20 for testing the fixtures 12 of the tester rack 11 is shown in FIG. 2. The external dimensions, the shape and the mass of the tool 20 are generally the same as a disk drive (not shown) typically received in the fixtures 12 of the rack 11. The device 20 has a generally rectangular chassis 21 to the opposed long sides of which are fitted detachable side plates or rails 22. The rails 22 can be milled or otherwise profiled in order to allow the overall mass of the tool 20 to be adjusted to correspond to that of the disk drive normally received in the fixture 12. Similarly, the length and height of the rails 22 can be set to correspond to the external dimensions of a disk drive normally received in the fixtures 12. A variety of different size rails 22 can be provided so that the same basic chassis 21 can be used with different rails 22 to mimic disk drives of different sizes and masses.

The chassis 21 has a base plate 23 on which is centrally fixed a bearing 24. A "butterfly" voice coil 25 is mounted on the bearing 24 and can rotate about the central axis of the bearing 24 which is perpendicular to the base 23. The butterfly voice coil 25 has opposed wings 25A,25B. Each wing 25A,25B has a coil 26 which are connected in series with each other and to a flexible supply cable 27. A lid (not shown) is secured to appropriate fixing points in the chassis 21 to protect the internal components of the tool 20 and to provide a further bearing (not shown) for the butterfly voice coil 25.

A pair of magnet assemblies 30 is fixed to the chassis base 23 with one magnet assembly 30 being positioned on either side of the bearing 24. Each magnet assembly 30 has a magnet assembly base plate 31 carrying two permanent magnets 32 arranged on a sector around the bearing 24. Each magnet assembly 30 further includes a magnet assembly top plate 33 which is spaced from its respective bottom plate 31 by spacing rods 34. (One of the top plates 33 is shown as being removed in FIG. 3.) Each magnet assembly top plate 33 has two permanent magnets (not shown in the drawings) positioned opposite and corresponding to the permanent magnets 32 of the corresponding magnet assembly bottom plate 31. As can be seen in FIG. 2, in the assembled tool 20 the voice coil 25 is mounted so that the wings 25A,25B of the butterfly voice coil 25 are mounted between the bottom and top plates 31,33 of a respective magnet assembly 30.

The butterfly voice coil 25 and the magnet assemblies 30 provide a rotary actuator which is balanced and which provides pure torque when a current is applied to the coils 26 via the supply cable 27. This rotary torque and resultant movement of the butterfly voice coil 25 mimics the motion of an arm of a hard disk drive which is moved by a rotary actuator. It will be appreciated that a different arrangement for the coil 25 and permanent magnet 32 can be used to mimic the movement of an arm which is moved by a linear actuator if required.

The chassis 21 further includes two accelerometers 40 which are known in themselves and the operation of which will not be described in detail herein. The two accelerometers 40 are mounted on opposite sides of the bearing 24 on a line which passes through the bearing 24. As a result of this positioning of the accelerometers 40, the difference between the output signals of the two accelerometers 40 provides a measure only of the rotary acceleration of the tool 20.

As will be described in more detail below, the input current or signal to the butterfly voice coil 25 typically has a range of 5 to 1200 Hz. It is desirable to ensure that the tool 20 does not have internal resonances within this measurement range of 5 to 1200 Hz. It is also desirable to centralise the butterfly voice coil 25 in the tool 20 so that the respective wings 25A,25B of the butterfly voice coil 25 sit symmetrically within their respective magnet assemblies 30 at rest. A mechanical restoring spring could be used to centralise the butterfly voice coil 25, but it is difficult to avoid resonances within the frequency range of interest using a mechanical spring. Mechanical springs are also prone to fatigue and, generally, are not particularly reliable. Accordingly, in order to centralise the butterfly voice coil 25 of the tool 20, each wing 25A,25B of the butterfly voice coil has symmetrically mounted thereon two soft iron blocks 28. The soft iron blocks 28 act with the permanent magnets 32 to tend to centralise the butterfly voice coil 25 in the tool 20 and provide an extremely low resonant frequency of below 1 Hz. This allows the tool 20 to be used to measure using input signals down to around 5 Hz if desired. The soft iron blocks 28 provide a centralising mechanism which is reliable and not prone to fatigue.

The resonant frequency of the tool 20 as a whole should preferably be greater than about 1 kHz. This is particularly to ensure that the resonant frequency of the tool 20 is above the typical frequency of the open loop crossover of a hard disk drive, which is typically 700 Hz. The resonant frequency of the tool 20 can be adjusted by various means, including adjusting the overall mass of the tool 20 by using side plates or rails 22 of different size and configuration. In addition, the overall resonant frequency of the tool 20 can be adjusted by providing the chassis 21 with internal ribs 29 of appropriate shape, size and position.

Figure 5:
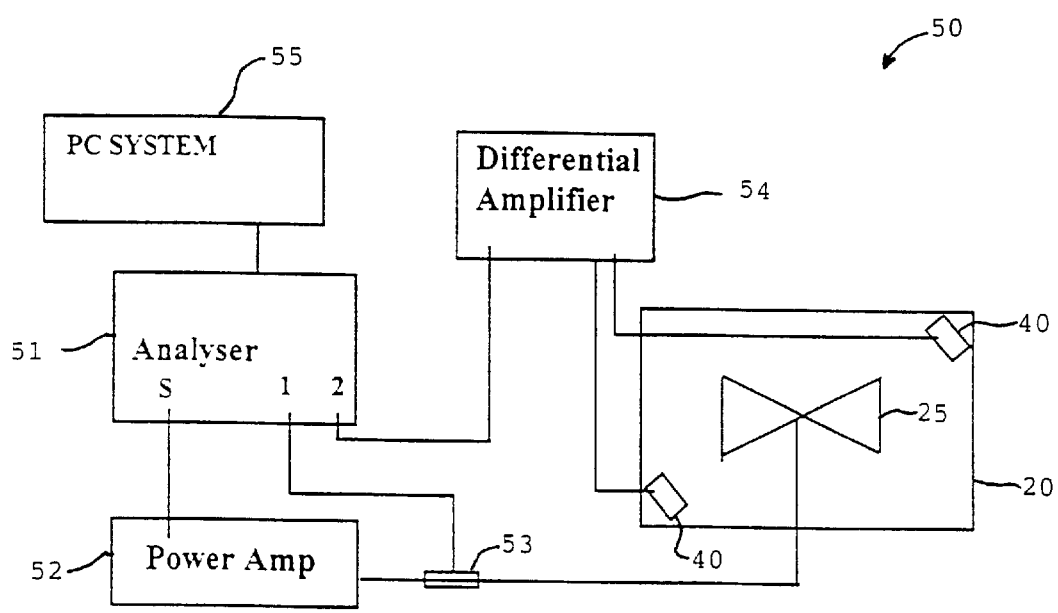
FIG. 5 is a schematic circuit diagram of an example of apparatus in accordance with the present invention.

Apparatus 50 incorporating the tool 20 described above is shown schematically by way of example in FIG. 5. A transfer function analyser 51 provides a drive or input signal on an output S. The drive signal is amplified by a power amplifier 52 before being passed to the series connected coils 26 of the butterfly voice coil 25. A current sensor 53 senses the drive signal provided to the butterfly voice coil 25 and provides an output to a first input 1 of the analyser 51. The drive signal provided to the butterfly voice coil 25 may be any suitable source signal such as a white noise or swept sine signal. In the preferred embodiment, the drive signal to the butterfly voice coil 25 is a "chirp" containing a set of frequencies in the range 200 to 1200 Hz, this being the frequency range which can be analysed by a typical transfer function analyser 51.

Movement of the butterfly voice coil 25, which mimics the movement of an arm driven by a rotary position actuator of a hard disk drive, will usually generate a rotary reaction torque in the tool chassis 21 in particular and in the tool 20 as a whole which acts in a direction opposite the movement of the butterfly voice coil 25. The tool 20 is therefore accelerated in a rotary direction. This acceleration is detected by the two accelerometers 40. The output signals from the accelerometers 40 are provided to a differential amplifier 54 which takes the difference of the output signals of the accelerometers 40 and amplifies that difference to provide an output signal which is passed to a second input 2 of the analyser 51. That signal to the second input 2 of the analyser 51 is therefore a measure of the rotary acceleration given to the tool 20 as a whole by the reaction to rotary movement of the butterfly voice coil 25 of the tool 20.

In known manner, the analyser 51 provides a transfer function for the drive signal to the butterfly voice coil 25 across the range of test frequencies. That transfer function is then passed to a computer 55. The transfer function so obtained for the fixture 12 is compared with a standard in the computer 55 and the particular fixture 12 being tested can be passed or failed on the basis of that comparison. The set of data held by the computer 55 which acts as the standard reference for the transfer function can be obtained experimentally by testing a set of fixtures 12 using conventional testing techniques, for example.

The present invention provides a method and apparatus for testing fixtures 12 in which a device having an arm which is movable by an actuator is normally mounted. The present invention further provides a tool 20 for such testing. In the specific example described above, the test measurement process itself takes approximately ten seconds and the analysis in the analyser 51 and computer 55 can take place in a matter of six seconds or so. The time therefore to test a rack 11 having thirty-two fixtures 12 is approximately ten to fifteen minutes in this example. This compares with an overall testing time of two hours thirty minutes for a typical prior art testing method of testing the fixtures 12 of a test rack 11. The present invention also enables the identification of particular frequencies for the drive signal to the butterfly voice coil 25 which give rise to particularly problematic reaction forces from the fixture 12, which has simply not been possible previously. This identification of particularly problematic frequencies can aid in the determination of the causes of the problem in the fixture 12. The testing method, apparatus and particularly the tool of the invention provide a standard test for the fixtures 12 as the same or a calibrated tool 20 can be used in each fixture 12 under test. It will be appreciated that the standard or criteria used to pass or fail a particular fixture 12 by the computer 55 needs to be determined for each type of disk drive the operation of which is being mimicked by the tool 20.

An embodiment of the present invention has been described with particular reference to the example illustrated. However, it will be appreciated that variations and modifications may be made to the example described within the scope of the present invention.

What is claimed is:

1. A tool for mounting in and testing a fixture used for mounting a device having an arm which is movable to selected locations by an actuator, the tool being subjected to an acceleration, the tool comprising:
   a movable member which is movable to mimic movement of an arm of said device mounted in the fixture; and,
   at least one accelerometer for measuring the acceleration of the tool in a fixture in which the tool is mounted as a reaction to movement of the movable member.

2. A tool according to claim 1, wherein the movable member is arranged to move solely in a rotary direction about an axis.

3. A tool according to claim 2, wherein the movable member comprises a coil mounted for rotary movement about said axis, the tool further comprising a permanent magnet coupled magnetically to the coil such that the coil moves about said axis when a current is applied to the coil.

4. A tool according to claim 3, wherein the coil is a butterfly coil and comprising a permanent magnet for each wing of the coil.

5. A tool according to claim 3 or claim 4, comprising a magnetically soft material mounted on the coil which acts with the permanent magnet to centralise the coil in the tool.

6. A tool according to claim 1, wherein the measuring means is arranged to measure rotary movement of the tool.

7. A tool for mounting in and testing a fixture used for mounting a device having an arm which is movable to selected locations by an actuator, the tool comprising:
   a movable member which is movable to mimic movement of an arm of a device mounted in the fixture; and
   means for measuring movement of the tool in a fixture on which the tool is mounted as a reaction to movement of the movable member, wherein the measuring means is arranged to measure rotary movement of the tool and comprises two accelerometers arranged on a line passing through a centre of rotation of the tool and on opposite sides of said centre of rotation such that the difference between the outputs of said accelerometers provides a measure of rotary movement of said tool only.

8. A tool according to claim 1, wherein the tool has detachable plates.

9. Apparatus for testing a fixture used for mounting a device having an arm which is movable by an actuator, the apparatus comprising:
   a tool having a movable member which is movable to mimic movement of an arm of a device mounted in the fixture;
   means for measuring movement of the tool in a fixture on which the tool is mounted as a reaction to movement of the movable member; and, movement comparing means for comparing the movement of the movable member with movement of the tool in a fixture in which the tool is mounted as a reaction to movement of the movable member;

drive means for providing a drive signal to drive the movable member to move within a fixture;

means for outputting a movement signal indicative of movement of the tool in fixture in which the tool is mounted as a reaction to movement of the movable member;

the movement comparing means comprising signal comparing means for comparing the drive signal with the movement signal; and, determining means for determining whether the fixture passes or fails on the basis of said comparison.

10. Apparatus according to claim 9, wherein the movable member is arranged to move solely in a rotary direction about an axis.

11. Apparatus according to claim 10, wherein the movable member comprises a coil mounted for rotary movement about said axis, the tool further comprising a permanent magnet coupled magnetically to the coil such that the coil moves about said axis when a current is applied to the coil.

12. Apparatus according to claim 11, wherein the coil is a butterfly coil and comprising a permanent magnet for each wing of the coil.

13. Apparatus according to claim 11 or claim 12, comprising a magnetically soft material mounted on the coil which acts with the permanent magnet to centralise the coil in the tool.

14. Apparatus for testing a fixture used for mounting a device having an arm which is movable by an actuator, the apparatus comprising:

a tool having movable member which is movable to mimic movement of an arm of a device mounted in the fixture;

means for measuring movement of the tool in a fixture on which the tool is mounted as a reaction to movement of the movable member; and, movement comparing means for comparing the movement of the movable member with movement of the tool in a fixture in which the tool is mounted as reaction to movement of the movable member;

wherein the measuring means comprises an accelerometer for measuring the acceleration of the tool in a fixture in which the tool is mounted as a reaction to movement of the movable member.

15. Apparatus for testing a fixture used for mounting a device having an arm which is movable by an actuator, the apparatus comprising:

a tool having a movable member which is movable to mimic movement of an arm of a device mounted in the fixture;

means for measuring movement of the tool in a fixture on which the tool is mounted as a reaction to movement of the movable member, the measuring means being arranged to measure rotary movement of the tool; and, movement comparing means for comparing the movement of the movable member with movement of the tool in a fixture in which the tool is mounted as a reaction to movement of the movable member;

wherein the measuring means comprises two accelerometers arranged on a line passing through a centre of rotation of the tool and on opposite sides of said centre of rotation such that the differences between the outputs of said accelerometers provides a measure of rotary movement of said tool only.

16. A method of testing a fixture used for mounting a device having an arm which is movable by an actuator, the method comprising the steps of:

inserting a tool having a movable member in said fixture;

moving the movable member in the fixture to mimic movement of an arm of a device normally mounted in the fixture by applying a drive signal to the movable member to cause the movable to move;

measuring movement of the tool in the fixture as a reaction to movement of the movable member by obtaining an output signal representative of the movement of the tool in response thereto; and, comparing the movement of the movable member with movement of the tool in response thereto by comparing the drive signal with the output signal to obtain a transfer function for the fixture, the transfer function being compared with a standard in the determining step.

* * * * *